(12) United States Patent
Schilling (10) Patent No.: US 7,464,767 B2
(45) Date of Patent: Dec. 16, 2008

(54) DISC OPENER FOR AN AGRICULTURAL PLANTING APPARATUS

(75) Inventor: Robin Schilling, Darfield (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 11/746,161

(22) Filed: May 9, 2007

(65) Prior Publication Data

US 2008/0276848 A1   Nov. 13, 2008

(51) Int. Cl.
*A01B 15/10* (2006.01)
*A01B 15/16* (2006.01)
*A01B 23/06* (2006.01)
*A01B 31/00* (2006.01)
*A01B 59/00* (2006.01)

(52) U.S. Cl. .............. 172/604; 172/762; 403/306; 111/121; 111/140; 111/167; 111/192

(58) Field of Classification Search .............. 111/121, 111/122, 140, 163–169, 192, 193; 172/518, 172/604, 681, 762; 403/300, 306
See application file for complete search history.

(56) References Cited

U.S. PATENT DOCUMENTS 4,685,585 A * 8/1987 Robbins ............... 220/256.1

6,702,398 B2 * 3/2004 Laps ..................... 301/105.1
2005/0105965 A1 * 5/2005 Chiang ................... 403/344

OTHER PUBLICATIONS

Ingersoll, Individually Mounted, Centerless Disks, PowerPoint presentation, photos taken on Nov. 15, 2007.

* cited by examiner

*Primary Examiner*—Christopher J. Novosad
(74) *Attorney, Agent, or Firm*—Rebecca Henkel

(57) ABSTRACT

A disc opener assembly for an agricultural planter includes a coulter disc formed without a pilot hole for the spindle of the mounting hub. The mounting hub is formed without the spindle such that the coulter disc is supported directly in a cantilevered manner from the mounting flange of the mounting hub. The coulter disc is formed with fastener holes aligned with mounting holes in the mounting flange for the passage of fasteners to affix the coulter disc to the mounting flange. The fasteners are countersunk into the coulter disc to present a smooth exterior surface. A seal is positioned between the mounting flange and the coulter disc to prevent the entry of dirt and debris into the mounting hub. No dust cap on the exterior surface of the coulter disc is required with this configuration which improves the operation of the disc opener assembly.

5 Claims, 7 Drawing Sheets

DISC OPENER FOR AN AGRICULTURAL PLANTING APPARATUS

FIELD OF THE INVENTION

The present invention relates generally to agricultural planters and seeders that form a furrow in the ground for the placement of seeds therein, and more particularly, to a disc opener for creating a furrow for the placement of seeds that does not contain a dust cap.

BACKGROUND OF THE INVENTION

Agricultural planting machines are manufactured in different forms, one of which is a device commonly referred to as an air seeder. The air seeder carries seed, fertilizer and possibly other chemicals in a tank that opens into a pneumatic conveyance mechanism that transports the seed and perhaps fertilizer to a planting apparatus, one of which can be commonly referred to as a disc opener.

Disc openers are designed to move through the soil and place product such as seed, fertilizer, or other micronutrients into the ground while creating as little disturbance as possible to the surrounding environment. To accomplish this goal, the disc usually opens a small trench or furrow into the ground in which the product is place. A pneumatic conveyance mechanism then conveys the product from the central tank to the small trench.

Figure 6:
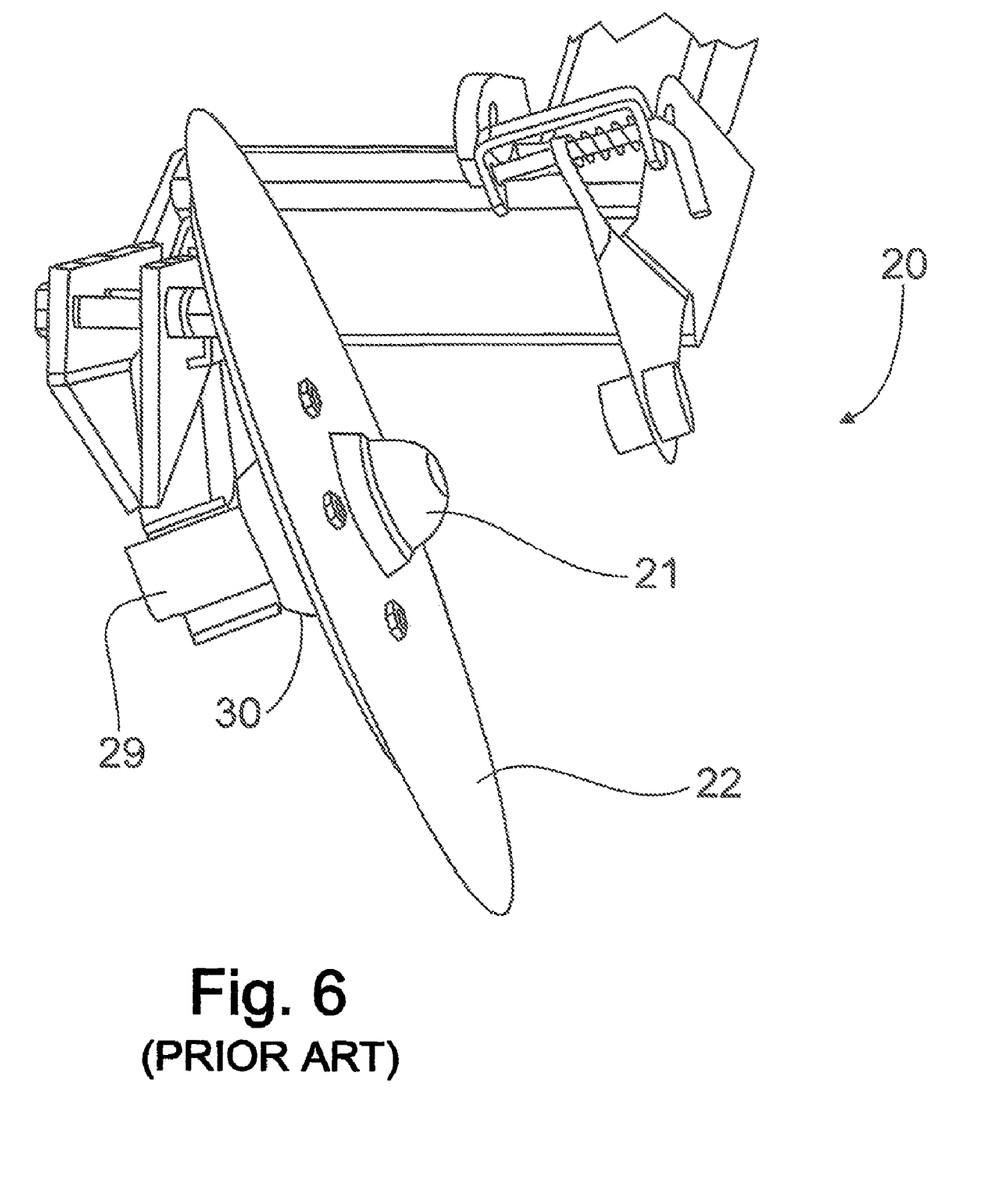
FIG. 6 is a partial perspective view of a conventional, prior art disc opener assembly formed with a dust cap.

As shown in FIG. 6, the disc 22 typically contains a dust cap 21 to prevent dust, dirt, and other contaminants from entering into the bearings (not shown). However, if the dust cap 21 is not held on by a retaining strap (not shown), the dust cap 21 may be easily knocked off the disc 22 by debris in the field, thereby permitting dirt and other debris to enter into and clog the bearings located in the hub 26. Moreover, the dust cap 22 is easily damaged in the field or when it is removed to access the hub 26 for service, and often needs to be replaced.

In addition, the dust cap 22 can limit the range of motion of a gauge wheel 24 due to the interference between the dust cap 21 and the inside of the gauge wheel rim. As can be seem in FIG. 2, the gauge wheel 24 has an axis of rotation A (indicated in FIGS. 3 and 5) that is located in close proximity to the axis of rotation of the disc 22, which undesirably permits soil to build up on the disc 22.

Accordingly, it is desirable to provide a disc opener that overcomes the disadvantages of the known prior art disc openers.

SUMMARY OF THE INVENTION

Accordingly, an important object of the present invention is to provide a disc that does not contain a dust cap.

It is another object of the present invention to provide a disc opener assembly in which the disc does not contain a pilot hole.

It also an object of the present invention to provide a seal between the hub and the disc to keep contaminants out of the hub.

It is a feature of the present invention the gauge wheel is mounted behind the disc so that there is no interference between the gauge wheel and the disc and a reduction in the amount of soil buildup on the disc.

It is an advantage of the present invention that the disc does not contain a dust cap that can be damaged or lost during operation of the disc opener.

It is another advantage of the present invention that the positioning of the gauge wheel behind the disc allows for easier self cleaning of the disc.

It is a further object of the present invention to provide a disc for a disc opener that is durable in construction, inexpensive to manufacture, carefree in maintenance, and simple and effective in use.

These and other objects, features, and advantages are accomplished according to the present invention by providing a disc opener assembly for an agricultural planter that includes a coulter disc formed without a pilot hole for the spindle of the mounting hub. The mounting hub is formed without the spindle such that the coulter disc is supported directly in a cantilevered manner from the mounting flange of the mounting hub. The coulter disc is formed with fastener holes aligned with mounting holes in the mounting flange for the passage of fasteners to affix the coulter disc to the mounting flange. The fasteners are countersunk into the coulter disc to present a smooth exterior surface. A seal is positioned between the mounting flange and the coulter disc to prevent the entry of dirt and debris into the mounting hub. No dust cap on the exterior surface of the coulter disc is required with this configuration which improves the operation of the disc opener assembly.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENTS

Figure 1:
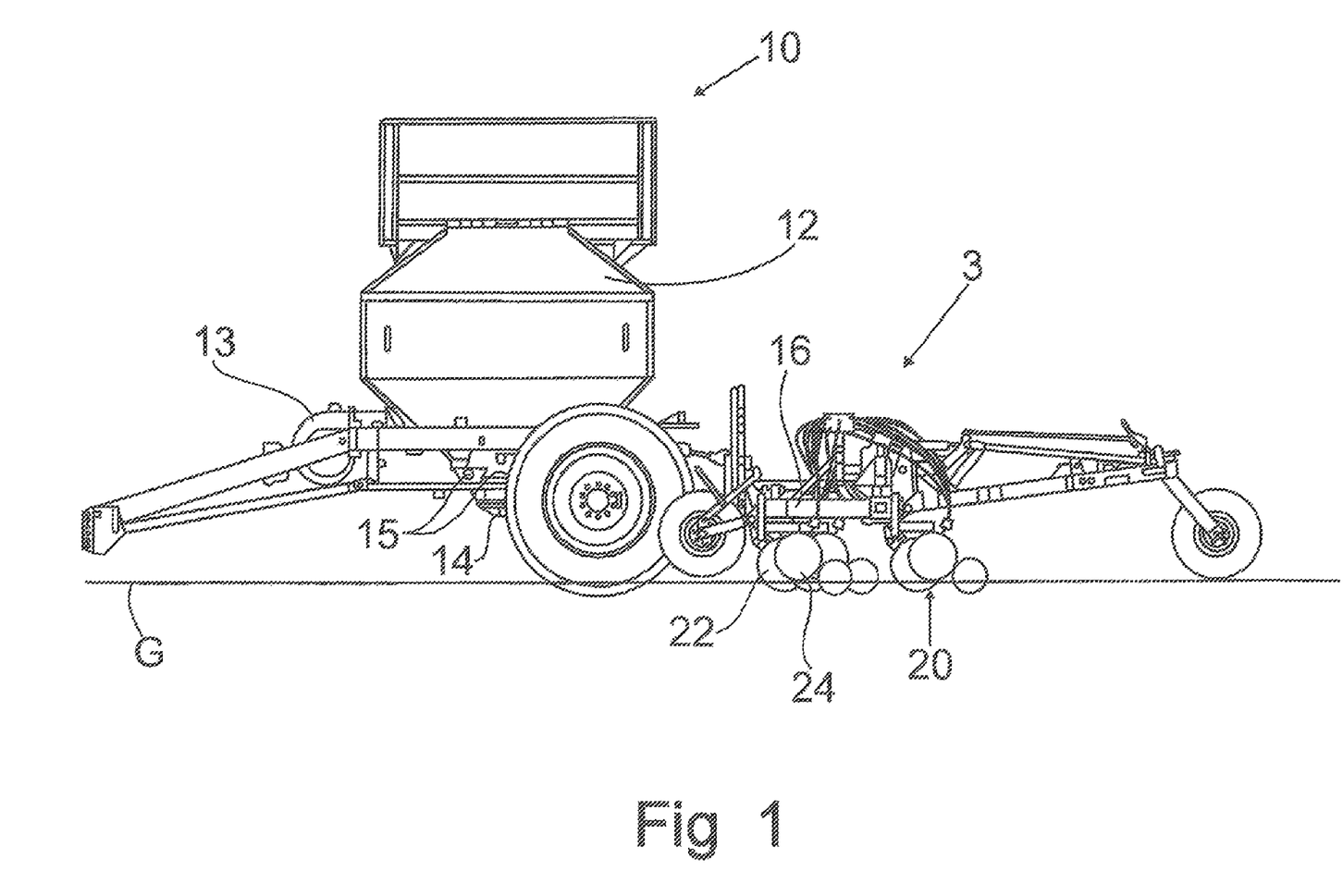
FIG. 1 is a side elevational view of an air seeder having a planting mechanism attached thereto and incorporating the principles of the instant invention.

Referring to FIG. 1, an air seeder incorporating the principles of the present invention can best be seen. Any left and right references are used as a matter of convenience and are determined by standing at the rear of the vehicle and facing forwardly into the direction of travel toward the tractor to which the air seeder is customarily attached for motive and operative power.

The air seeder 10 is customarily attached to a tractor (not shown) in a conventional manner to provide power for both mobile movement of the air seeder over the ground G and operative power for the operation of the components of the air seeder 10, as will be described in greater detail below. The air seeder 10 is provided with a central tank 12, which can be multi-compartmental to provide storage capacity for seed, fertilizer and other products to be applied to the ground for the planting process. A fan mechanism 13 provides a source a high velocity air to be forced through tubing 14 coupled to the tank 12 to receive a supply of product therefrom for dispensing to the ground in a conventional manner. A metering mechanism 15 controls the flow of product into the pneumatic tubing 14 to control the rate of flow of product to the ground G. While the principles of the instant invention will be shown and described in conjunction with an air seeder, one skilled in the art will readily recognize that the instant invention can be used on any planting mechanism or tillage mechanism using a disc coulter to engage the ground G.

Figure 2:
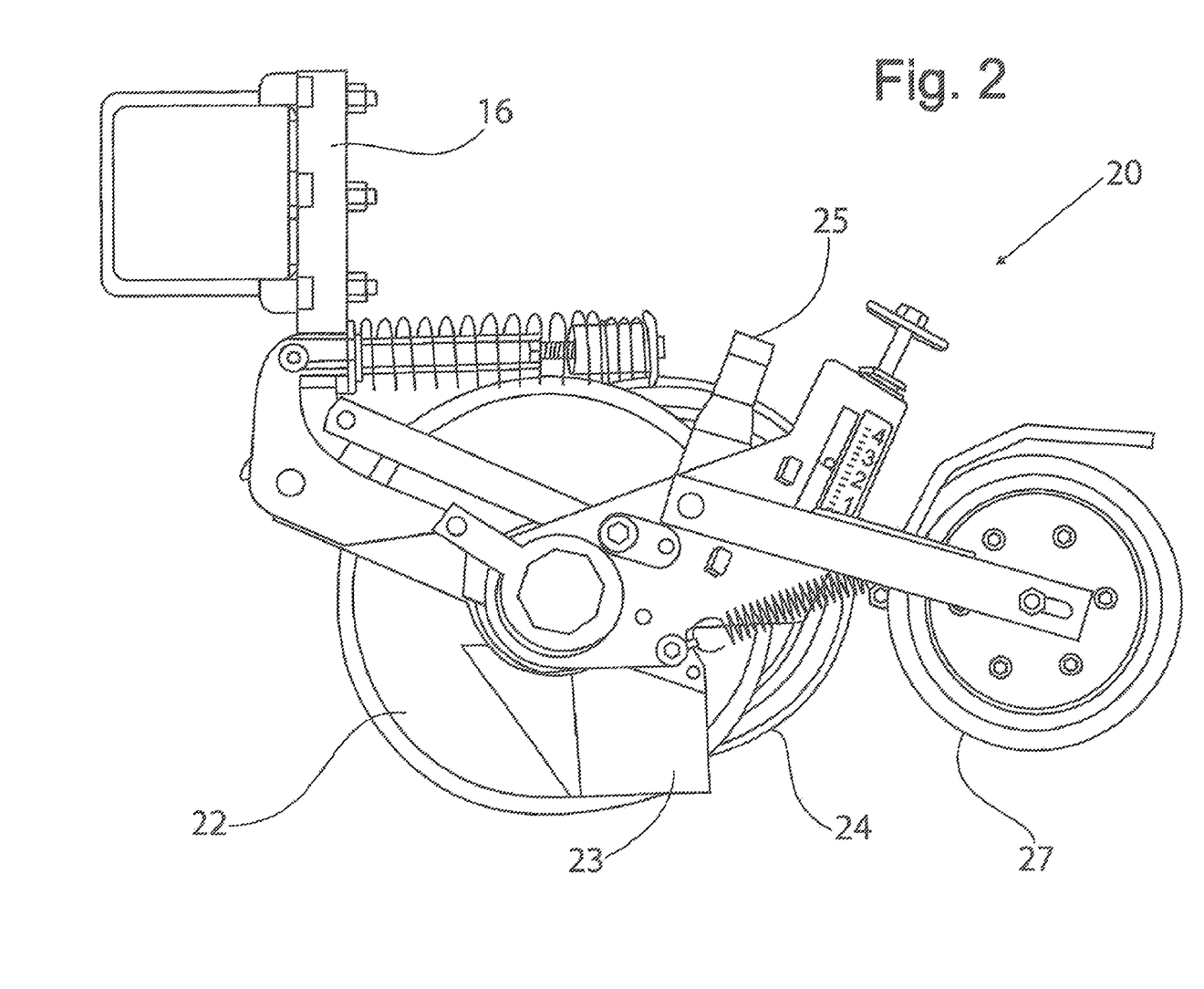
FIG. 2 is a side elevational view of a disc opener assembly used on the planter mechanism of FIG. 1.
Figure 3:
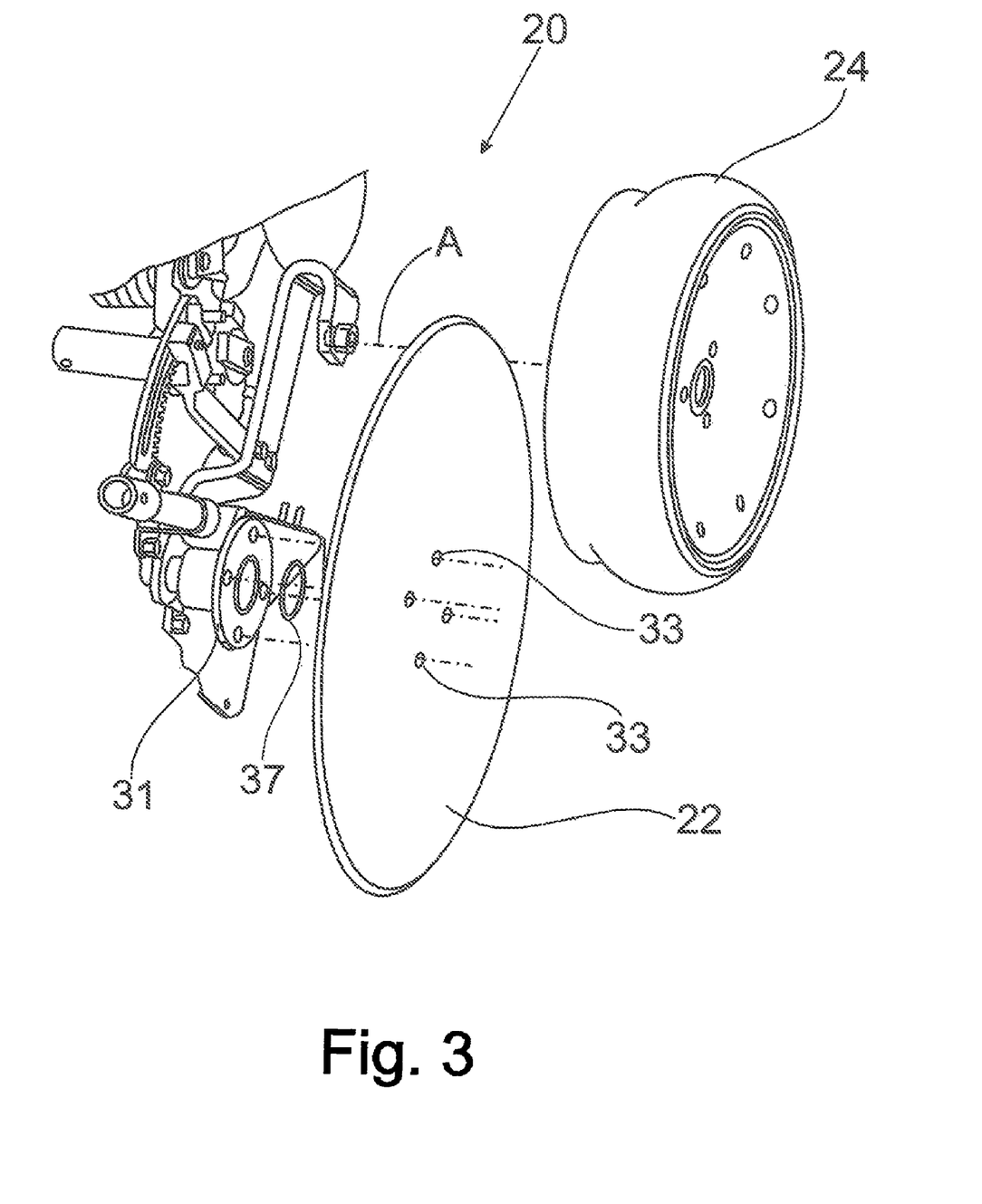
FIG. 3 is an exploded perspective view of a disc opener assembly incorporating the principles of the instant invention.

As best seen in FIGS. 1-3, the planting mechanisms 3 attached to the air seeder 10 in a trailing manner relative thereto is provided with a plurality of transversely spaced, and possible longitudinally spaced, disc opener assemblies 20 to form a trench or furrow into the surface of the ground G to provide a seed bed for the placement of seed and fertilizer, etc. being dispensed from the central tank 12. The disc opener assembly 20 is suspended from a frame component 16 of the air seeder to preferably trail behind the tank 12 and includes a coulter disc 22 that forms a small trench into the surface of the ground G. A scraper 23 helps to keep the coulter disc 22 clean of soil as the coulter disc 22 passes through the ground G and prevents loose soil from falling into the furrow while the seed is being placed into the furrow. An adjustable gauge wheel 24 determines the depth to which the coulter disc 22 cuts into the ground G as the gauge wheel 24 rides on top of the ground surface. A press wheel 27 trails the coulter disc 22 to close the trench formed in the ground after the placement of the seed, fertilizer and/or other product into the trench.

A seed tube 25 is supported on the disc opener to drop seed and other product into the trench formed by the coulter disc 22. The seed tube 25 is positioned adjacent the coulter disc 22 to drop seed and other product into the trench as the coulter disc 22 withdraws from the ground G. As one of ordinary skill in the art will recognize, some configurations of disc opener assemblies 20 will have multiple product delivery tubes 25 to place different product in different portions of the furrow.

Figure 5:
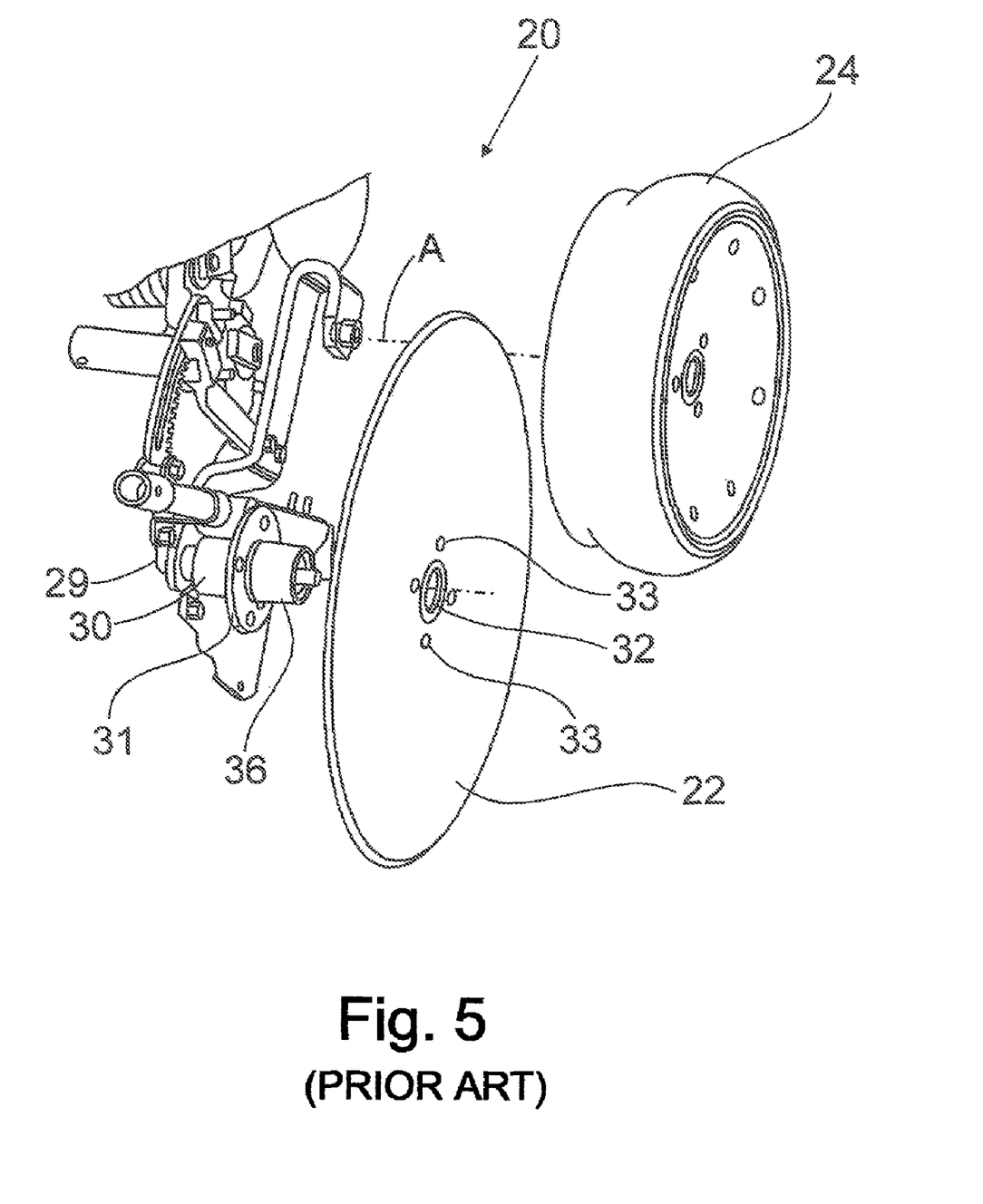
FIG. 5 is an exploded perspective view of a disc opener assembly similar to that of FIG. 3, but reflecting the prior art disc mounting arrangement.

Referring now to FIGS. 5 and 6, the conventional, prior art configuration of a disc opener 20 can be seen. The coulter disc 22 is formed with a central opening 26a through which the spindle 36 of a mounting hub 30 passes to rotatably support the coulter disc 22 on the assembly 20. The mounting hub 30 is mounted on the frame 29 of the disc opener assembly 20 and contains bearings (not shown) to provide rotational support from the frame 29. To keep dirt and other debris from the ground G during operation of the disc opener 20 from entering into mounting hub 30 to foul the bearings therein, a dust cap 38 is affixed to the surface of the coulter disc 22 opposite the mounting hub 30. Under some severe operating conditions, a retaining strap (not shown) is sometimes added to the exterior of the dust cap 38 to keep the dust cap 38 from being knocked off of the disc opener assembly 20.

Figure 4A:
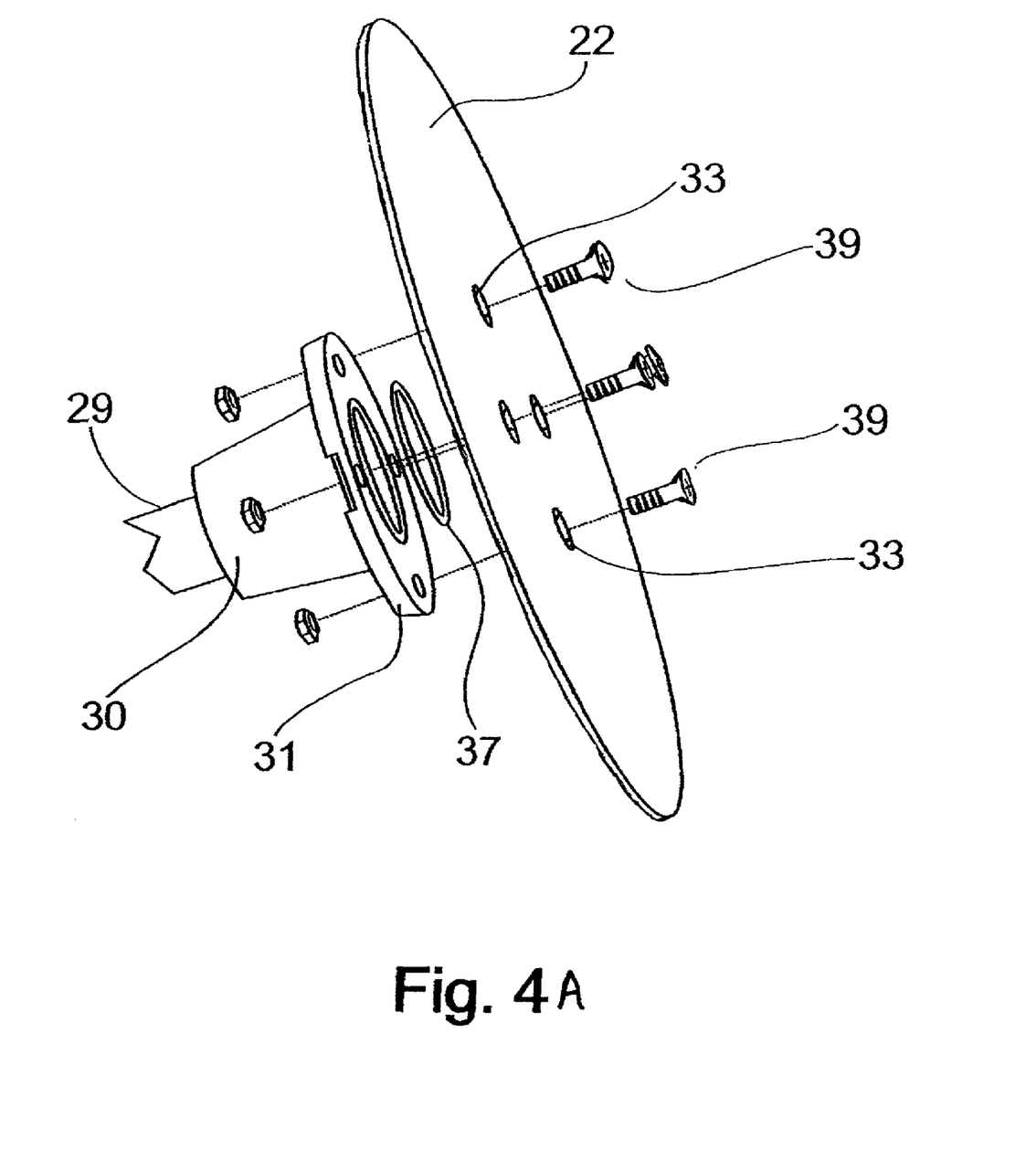
FIG. 4A is an exploded detail view of the mounting hub and disc formed without a need for a dust cap and FIG. 4B is a detailed view of the mounting hub and disc after assembly.
Figure 4B:
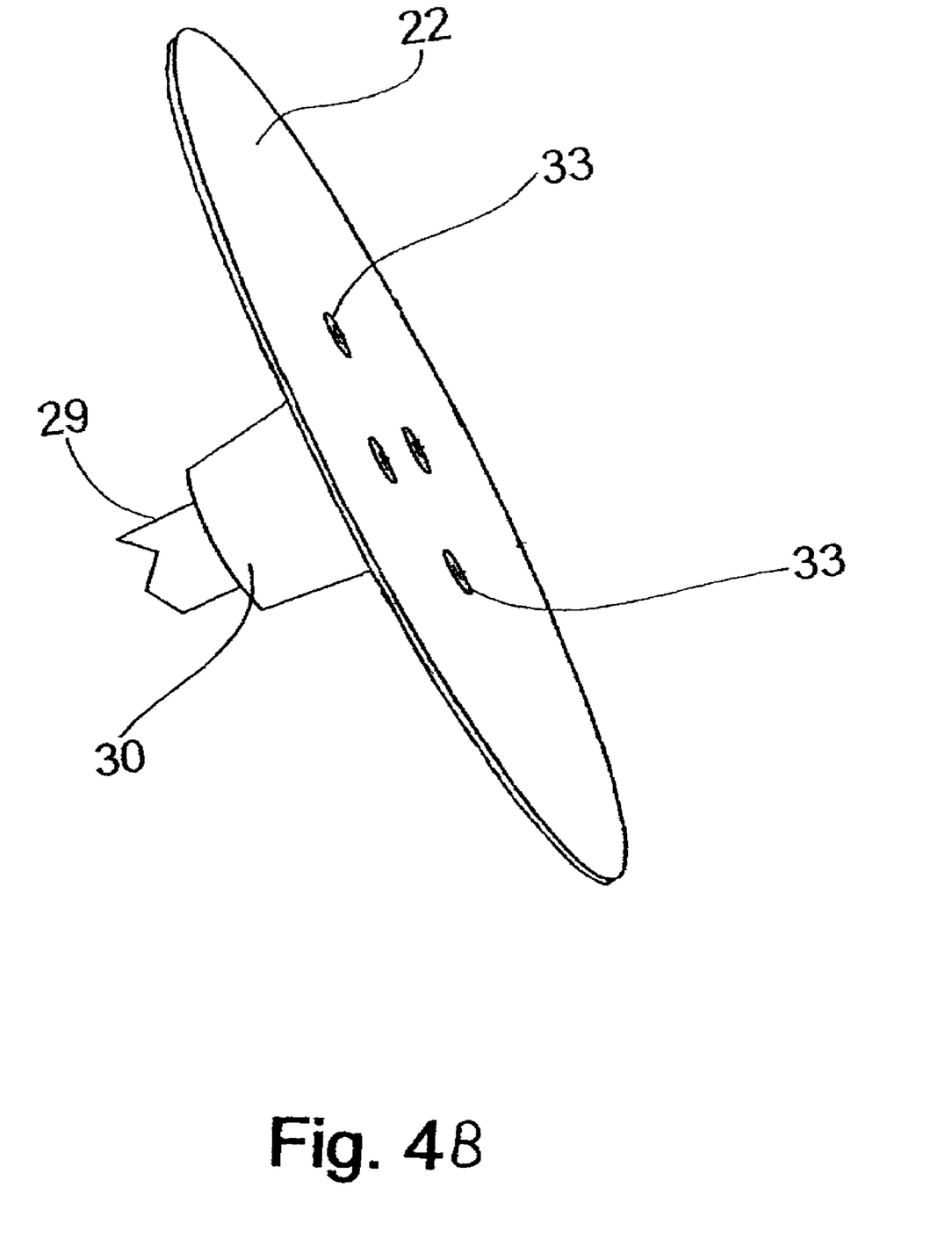

Referring now to FIGS. 3, 4A, and 4B the disc opener assembly 20 incorporating the principles of the present invention can best be seen. In its simplest embodiment, the coulter disc 22 is formed without the pilot hole 32 (depicted in FIG. 5) and the mounting hub 30 is formed without a spindle 36 such that the coulter disc 22 is mounted directly to the flange 31 of the mounting hub 30 by the fasteners 39. To prevent dirt from entering the mounting hub 30 between the coulter disc 22 and the mounting hub 30, a seal 37, such as an O-ring, is positioned between the coulter disc 22 and the flange 31 of the mounting hub 30. To present a smooth surface on the side of the coulter disc 22 opposite the mounting hub 30, the fasteners 39 are preferably have flat heads that can be countersunk into the body of the coulter disc 22. Accordingly, the holes 33 through the body of the coulter disc 22 through which the fasteners 39 pass to engage the flange 31 of the mounting hub 30 are formed with a countersink portion to receive the head of the fasteners 39. As a result, as shown in FIG. 4B, the exterior surface of the coulter disc 22 is substantially smooth and does not present a surface on which debris can accumulate.

Eliminating the dust cap from the structure of the disc assembly 20 enable the gauge wheel 24 to be mounted further rearwardly of the center axis of the coulter disc 22, thus creating a larger gap between the coulter disc 22 and the gauge wheel 24. This large gap provides an increased capability of the gauge wheel 24 to act as a cleaner of the exterior surface of the coulter disc 22, thereby reducing soil build-up between the coulter disc 22 and the gauge wheel 24.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A disc opener assembly for an agricultural planting apparatus comprising:
   a mounting hub rotatably supported on a frame, said mounting hub including a mounting flange having mounting holes therein;
   a coulter disc formed with fastener holes therethrough for alignment with the mounting holes in said mounting flange, said coulter disc being supported on said mounting hub without a spindle extending through said coulter disc;
   fasteners interengaging the fastener holes in said coulter disc and the mounting holes in said mounting flange to connect said coulter disc to said mounting flange; and
   a seal positioned between said mounting flange and said coulter disc to prevent contaminants from entering said mounting hub.

2. The disc opener of claim 1 wherein said fastener holes are formed with a countersink area to permit said fasteners to be countersunk into said coulter disc thus presenting a substantially smooth exterior surface of said coulter disc.

3. A coulter disc assembly for use in a tillage implement, comprising:
   a mounting hub rotatably supported on a frame member, said mounting hub including a mounting flange having mounting holes therein;
   a coulter disc formed with fastener holes therethrough to align with the mounting holes in said mounting flange;
   fasteners interengaging the fastener holes in said coulter disc and the mounting holes in said mounting flange to connect said coulter disc to said mounting flange, said coulter disc being supported in a cantilevered manner from said mounting hub; and
   a seal positioned between said mounting flange and said coulter disc to prevent contaminants from entering said mounting hub.

4. The coulter disc assembly of claim 3, wherein said fastener holes are formed with a countersink area to permit said fasteners to be countersunk into said coulter disc thus presenting a substantially smooth exterior surface of said coulter disc.

5. In a disc opener assembly for an agricultural tillage implement having a mounting hub rotatably supported on a frame member, said mounting hub including a mounting flange; and a coulter disc affixed to said mounting hub, the improvement comprising:

said coulter disc being mounted to said mounting flange without a spindle extending from said mounting hub through said coulter disc, said coulter disc being formed with holes therethrough only for the passage of fasteners to connect with said mounting flange, and a seal positioned between said mounting flange and said coulter disc to prevent the entry of contaminates into said mounting hub, wherein said holes through said coulter disc are formed with a countersink area to permit said fasteners to be countersunk into said coulter disc thus presenting a substantially smooth exterior surface of said coulter disc.

* * * * *